(12) United States Patent
Koike (10) Patent No.: US 8,633,832 B2
(45) Date of Patent: Jan. 21, 2014

(54) OBSTACLE DETECTION APPARATUS FOR VEHICLE

(75) Inventor: Hiroyuki Koike, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 558 days.

(21) Appl. No.: 12/760,901

(22) Filed: Apr. 15, 2010

(65) Prior Publication Data

US 2010/0265049 A1    Oct. 21, 2010

(30) Foreign Application Priority Data

Apr. 16, 2009 (JP) ................................. 2009-099620

(51) Int. Cl.
*G08G 1/16*    (2006.01)
(52) U.S. Cl.
USPC ............... 340/903; 340/435; 342/91; 342/70; 701/301
(58) Field of Classification Search
USPC ......... 340/435, 436, 438, 439, 457, 459, 460, 340/903, 425.5; 280/727; 342/52, 54, 342/118–158, 350, 385, 27, 89–94, 96, 342/70–72; 701/301
See application file for complete search history.

(56) References Cited

U.S. PATENT DOCUMENTS

| 6,204,755 B1* | 3/2001 | Kikuchi ........................ 340/435 |
| 2007/0241870 A1* | 10/2007 | Ohmura et al. ............... 340/435 |
| 2008/0068584 A1* | 3/2008 | Mori et al. .................... 356/5.01 |
| 2008/0169966 A1* | 7/2008 | Tsuchihashi et al. ........... 342/70 |

FOREIGN PATENT DOCUMENTS

| JP | 10-253759 | 9/1998 |
| JP | 11-115660 | 4/1999 |
| JP | 2003-149338 | 5/2003 |
| JP | 2005-077130 | 3/2005 |
| JP | 2005-077379 | 3/2005 |
| JP | 2006-349694 | 12/2006 |
| JP | 2007132748 A * | 5/2007 |
| JP | 2007240314 A * | 9/2007 |
| JP | 2007-279017 | 10/2007 |
| JP | 2008-070270 | 3/2008 |

* cited by examiner

*Primary Examiner* — Brian A Zimmerman
*Assistant Examiner* — Laura Nguyen
(74) *Attorney, Agent, or Firm* — Rankin, Hill & Clark LLP (57) ABSTRACT

In a vehicle obstacle detecting apparatus having a radar that transmits a laser beam in front of the vehicle to scan in different detection regions in a horizontal direction parallel to a road and receives reflection waves reflected from an object successively, it is determined whether a high reflection wave such as that reflected from delineator installed on the road at regular intervals exists in the received reflection waves in the detection regions, and if not, an obstacle such as a human being is detected from a low reflection wave. On the other hand, when the high reflection wave exists, the obstacle is detected from a second reflection wave.

4 Claims, 7 Drawing Sheets

OBSTACLE DETECTION APPARATUS FOR VEHICLE

BACKGROUND OF THE INVENTION

1. Field of the Invention

This invention relates to an obstacle detection apparatus for a vehicle, more particularly to an obstacle detection apparatus for a vehicle that is able to avoid a delay in detecting a low reflection object, such as a human being (pedestrian), without being affected by a high reflection object, such as a delineator.

2. Description of the Related Art

There is known a technique to emit a laser beam (electromagnetic wave) in front of (traveling direction of) a vehicle to scan a horizontal direction that is parallel to the road surface, receive reflection waves from a reflection object(s), and detect an obstacle such as a human being or vehicle on the road based on the received reflection waves exceeding a detection threshold value, as taught, for example, by Japanese Laid-Open Patent Application No. Hei 11 (1999)-115660.

SUMMARY OF THE INVENTION

On a road where a high reflection object(s) such as delineators is installed at regular intervals, when a low reflection object or obstacle, such as a human being, exists near the high reflection objects, since the reflection level of the high reflection objects is greater, the width of a reflection wave of the laser beam (electromagnetic wave) becomes larger than it actually is and hence, the human being may sometimes be fused or mixed therewith, thereby resulting in a delay in detection of the low reflection object.

A purpose of the present invention is to overcome this problem by providing an obstacle detection apparatus for a vehicle that can accurately discriminate low reflection objects, such as a human being, from a high reflection object (s) and, thereby avoiding delays in detecting the low reflection object.

The present invention provides an apparatus for detecting an obstacle present on a road on which a vehicle travels, comprising: an electromagnetic wave transceiver that transmits an electromagnetic wave in a course of travel of the vehicle so as to scan in different detection regions in a horizontal direction parallel to the road and receives reflection waves reflected from a reflection object successively; a high reflection wave determiner that determines whether a high reflection wave, whose reflection level exceeds a high detection threshold value, exists in the received reflection waves in at least one of the detection regions reflected from the reflection object; an obstacle determiner that determines whether a low reflection wave, whose reflection level exceeds a low detection threshold value set lower than the high detection threshold value, exists in the received reflection waves in the detection regions reflected from the reflection object when it is determined that the high reflection wave does not exist, and determines the reflection object as the obstacle; and a low reflection wave determiner that determines whether the low reflection wave reflected from a second reflection object exists in the detection regions other than the at least one when it is determined that the high reflection wave exists, wherein the obstacle determiner determines that the low reflection wave is reflected from the second reflection object and determines the second reflection object as the obstacle.

The present invention further provides a method of detecting an obstacle present on a road on which a vehicle travels having an electromagnetic wave transceiver that transmits an electromagnetic wave in a course of travel of the vehicle so as to scan in different detection regions in a horizontal direction parallel to the road and receives reflection waves reflected from a reflection object successively, comprising the steps of: determining whether a high reflection wave, whose reflection level exceeds a high detection threshold value, exists in the received reflection waves in at least one of the detection regions reflected from the reflection object; determining whether a low reflection wave, whose reflection level exceeds a low detection threshold value set lower than the high detection threshold value, exists in the received reflection waves in the detection regions reflected from the reflection object when it is determined that the high reflection wave does not exist, and determines the reflection object as the obstacle; and determining whether the low reflection wave reflected from a second reflection object exists in the detection regions other than the at least one when it is determined that the high reflection wave exists, wherein the step of obstacle determining determines that the low reflection wave is reflected from the second reflection object and determines the second reflection object as the obstacle.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment for implementing the obstacle detection apparatus for vehicle according to this invention is explained in the following with reference to the attached drawings.

Figure 1:
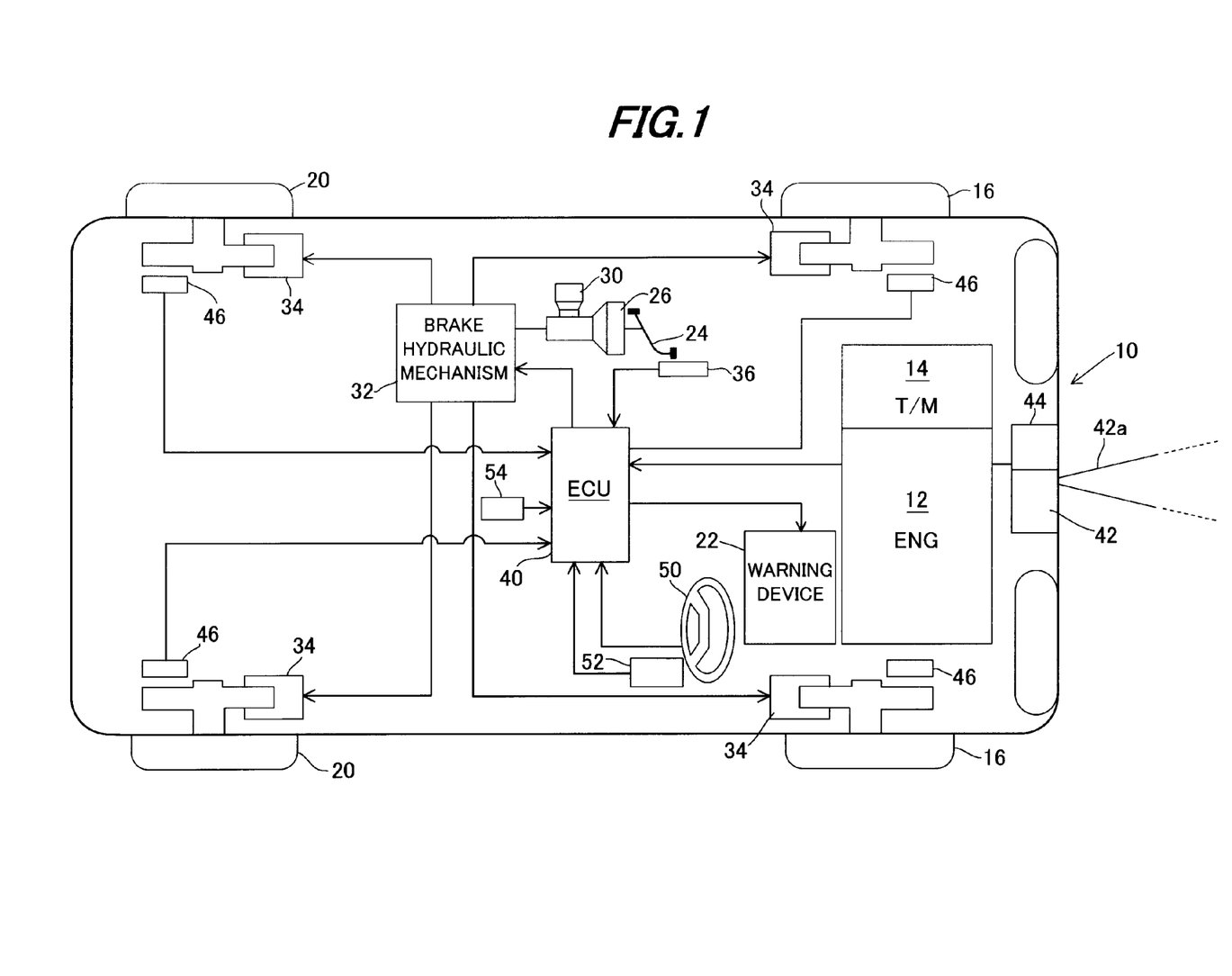
FIG. 1 is an overall schematic view of an obstacle detection apparatus for a vehicle according to an embodiment of this invention.

FIG. 1 is an overall schematic view of an obstacle detection apparatus for a vehicle according to an embodiment of this invention.

Symbol 10 in FIG. 1 designates a vehicle. The vehicle 10 is equipped at its front portion with a 4-cylinder internal combustion engine (denoted ENG in FIG. 1) 12. An output of the engine 12 is inputted to an automatic transmission (denoted T/M in FIG. 1) 14 that changes the rotational speed and transmits the resulting power to right and left front wheels 16 to drive, while making right and left rear wheels 20 follow, thereby driving the vehicle 10 to travel.

A warning device 22 comprising an audio speaker and an indicator (neither shown) is situated near the driver's seat of the vehicle 10 to alert the driver by audible and visible warnings. A brake pedal 24 installed at the floor surface of the driver's seat of the vehicle 10 is connected through a vacuum brake booster 26, master cylinder 30 and brake hydraulic mechanism 32 to a brake (disk brake) 34 disposed at each of the front wheels 16 and rear wheels 20.

When the driver depresses the brake pedal 24, the pedal depression force is amplified by the brake booster 26, and the master cylinder 30 uses the amplified depression force to produce brake force for operating the brakes 34 installed at the front wheels 16 and rear wheels 20 through the brake hydraulic mechanism 32 so as to decelerate or brake the vehicle 10. A brake switch 36 is installed near the brake pedal 24 and produces an ON signal when the brake pedal 24 is depressed by the driver.

The brake hydraulic mechanism 32 includes a group of electromagnetic solenoid valves installed at oil paths connected to a reservoir, a hydraulic pump, an electric motor for operating the hydraulic pump, and other components (none of which shown). The solenoid valves are connected to an electronic control unit (ECU) 40 through drive circuits so that the four brakes 34 are also operated by the ECU 40 independently of the depression of the brake pedal 24 by the driver.

A radar (laser scan radar) 42 is installed at the front portion of the vehicle 10. The radar 42 transmits or emits a laser beam (electromagnetic waves) in the surroundings of the vehicle 10 in the direction of travel at predetermined time intervals, and receives reflection waves generated through reflection of an object(s) including an obstacle(s) present around the vehicle 10.

An output of the radar 42 is sent to a radar output processing electronic control unit (ECU) 44 comprising a microcomputer. The radar output processing ECU 44 recognizes line segments constituting contour of an object based on an array of point group obtained by projecting points of reflection of reflection waves exceeding a detection threshold value (FIGS. 2 and 7) on a two-dimensional plane, and extracts edge points of the object from the recognized line segments. Also it detects an orientation or direction of the object based on incident direction of the reflection waves to obtain two-dimensional information.

Further, the radar output processing. ECU 44 calculates a relative distance (relative position) to the object by measuring a time period from emission of the laser beam until receipt of the wave reflected from the extracted edge point, and obtains relative speed to the object by differentiating the calculated relative distance.

Figure 2:
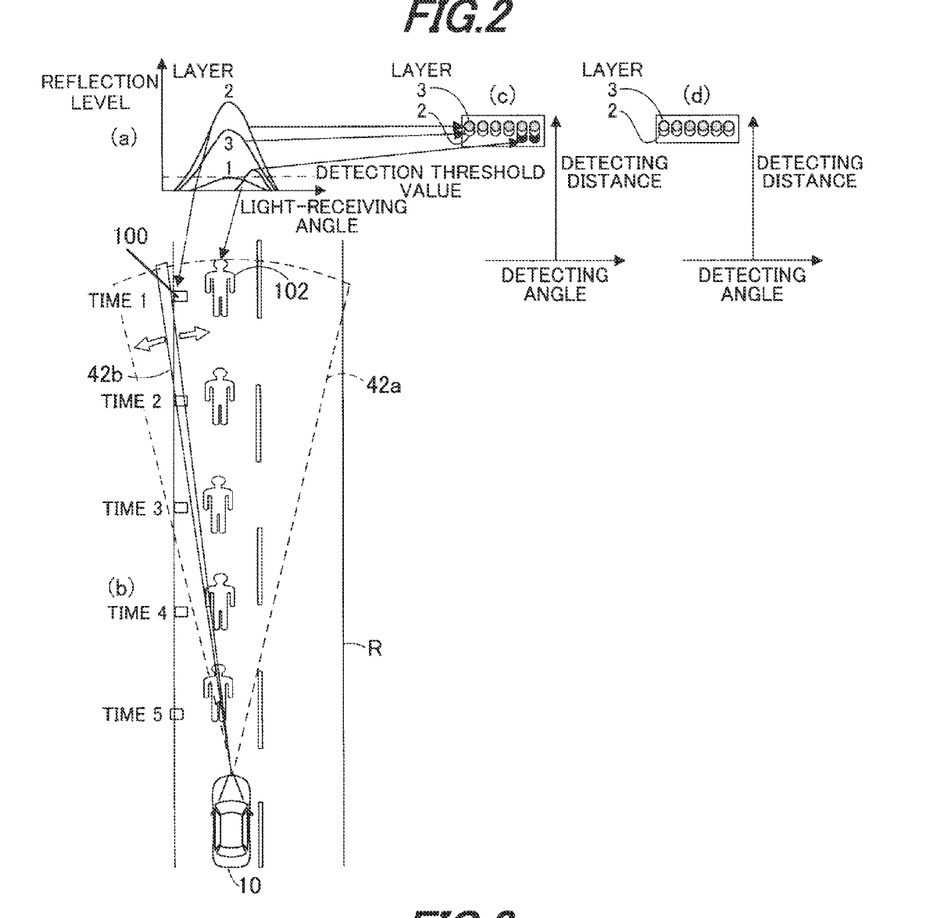
FIG. 2 is a set of views showing detection areas (scanning range) of a radar in the horizontal direction mounted on the vehicle shown in FIG. 1.
Figure 3:
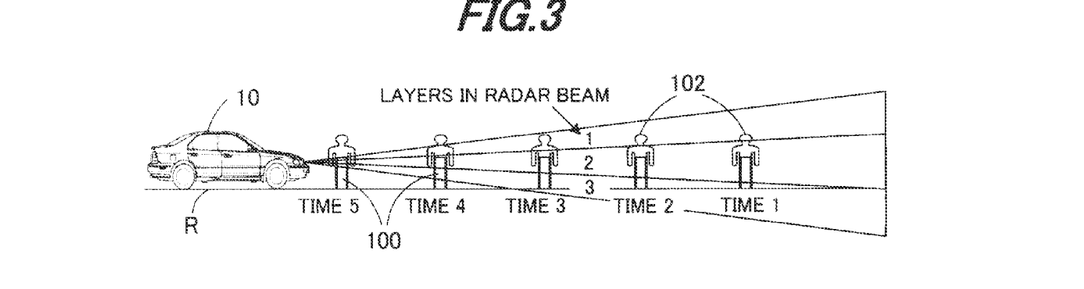
FIG. 3 is a side view of the vehicle showing the detection regions (layers) of the radar shown in FIG. 2 in the vertical direction.

In FIGS. 2 and 3, symbol 42a designates detection area (scanning range) of the radar 42 in the horizontal direction and vertical direction. Specifically, the radar 42 transmits the laser beam in the horizontal direction parallel to a road surface R around the vehicle 10 as shown in FIG. 2 and in the vertical direction perpendicular to the road surface R as shown in FIG. 3, at predetermined intervals, e.g., 100 milliseconds.

More specifically, the radar 42 transmits a thin laser beam 42b from left to right to scan the detection area 42a in the horizontal direction as shown in FIG. 2, moves the beam 42b up and down in the vertical direction by 1 degree as in the detection area 42a to scan, as shown in FIG. 3. Thus, as shown in FIG. 3, the detection area 42a comprises three different regions arranged in the vertical direction (above, middle and below regions called "layers", i.e., layer 1, layer 2 and layer 3 in the order from the top).

FIGS. 4(a) to 4(d) is a set of explanatory views showing road images photographed from the inside of the vehicle 10. Specifically, FIG. 4(a) is a image of the road taken from the inside of the vehicle 10 and FIGS. 4(b) to 4(d) are explanatory views explaining how to scan the road by the radar 42.

In FIG. 4(b), each window of the layer 1, 2 or 3 corresponds to the diameter or width of the laser beam 42b. As illustrated, the laser beam 42b is moved to scan from left to right in each layer in the detection area 42a.

Returning to the explanation of FIG. 1, the output of the radar output processing ECU 44 is sent to the ECU 40. Although not illustrated, the ECU 40 comprises a microcomputer having a CPU, RAM, ROM, I/O circuits, etc.

A wheel speed sensor 46 is installed near each of the front wheels 16 and rear wheels 20 and produces a pulse signal at every predetermined rotation angle of each wheel. A steering angle sensor 52 is installed near a steering wheel 50 in the vehicle driver's seat and produces an output or signal proportional to steering angle applied or inputted by the driver through the steering wheel 50. A yaw rate sensor 54 installed near the center of the vehicle 10 produces an output or signal corresponding to the yaw rate (angular velocity) of the vehicle 10 around its vertical axis (yaw axis) at the center of gravity.

The outputs of the foregoing sensors are also sent to the ECU 40. The ECU 40 detects traveling speed (vehicle speed) of the vehicle 10 by measuring interval of the outputs of each of the wheel speed sensors 46 and by calculating the average thereof, for example.

Figure 5:
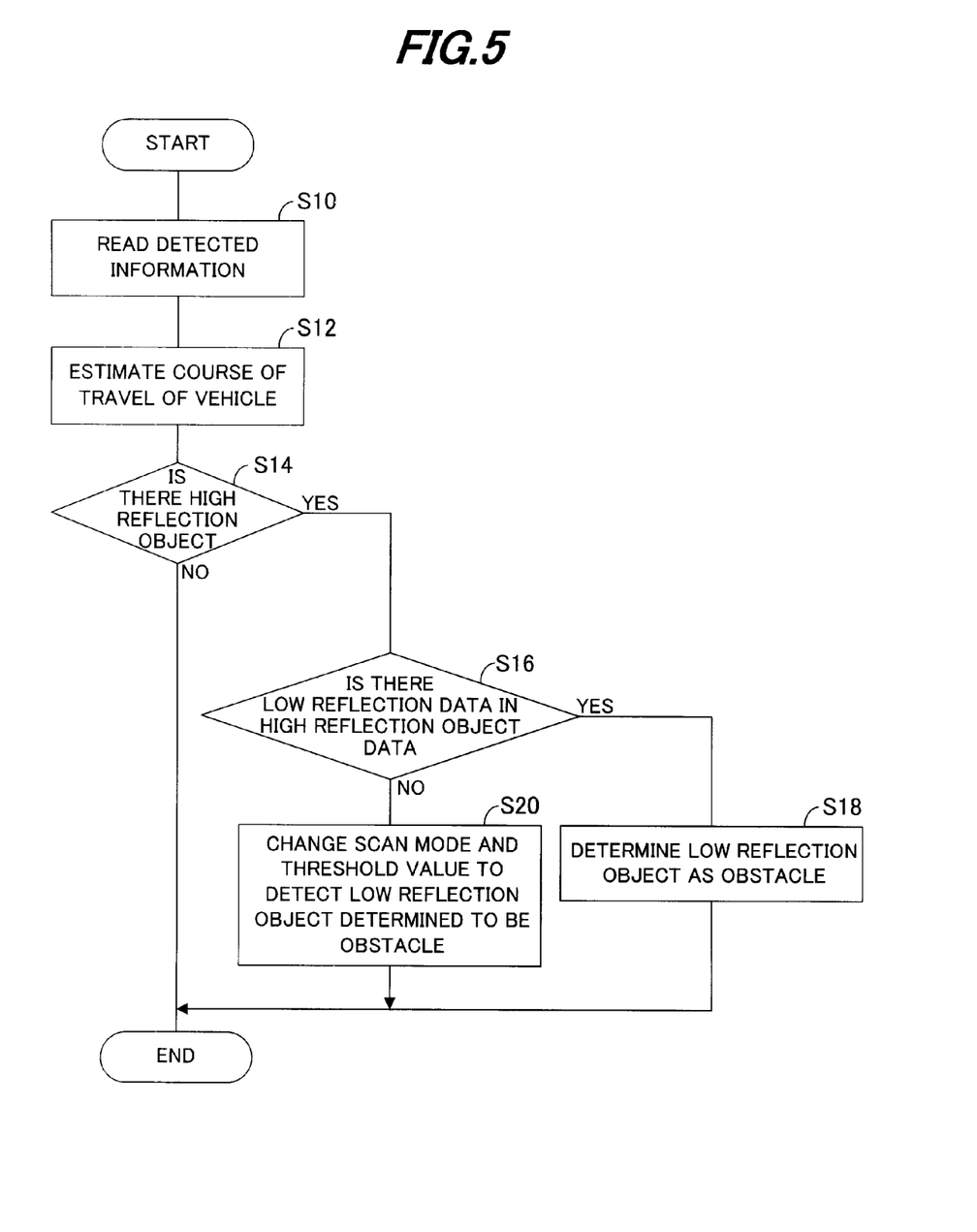
FIG. 5 is a flowchart for showing the operation of the apparatus shown in FIG. 1.

FIG. 5 is a flowchart for showing the operation of the apparatus shown in FIG. 1. The illustrated program is executed by the ECU 40 at predetermined intervals, e.g., 100 milliseconds.

The program starts at S10, in which the detected information of the sensors of the vehicle 10 including the radar output processing ECU 44 is read.

The program proceeds to S12, in which the direction or course of travel of the vehicle 10 is estimated based on the vehicle speed V of the vehicle 10 detected from the wheel speed sensors 46, the yaw rate detected from the yaw rate sensor 54, etc.

The program proceeds to S14, in which it is determined whether any of the reflection waves in the layers 1 to 3 exceeds a high detection threshold value (shown in FIG. 8(a)) set higher than a low detection threshold value (shown in FIGS. 2(a) and 7a). In other words, it is determined whether there is a high reflection object.

When the result in S14 is negative, the remaining steps are skipped. In this case, it is determined whether any of the reflection waves in the layers 1 to 3 exceeds the low detection threshold value. In other words it is determined whether there is an object whose reflection wave exceeds the low detection threshold value and detects an obstacle such as a human being or vehicle by determining the object whose reflection wave(s) exceeding the low detection threshold value as the obstacle.

On the other hand, when the result in S14 is affirmative, i.e., it is determined that there is a high reflection wave(s) in one of the layers 1 to 3, the program proceeds to S16, in which it is determined whether there is a low reflection wave(s) in the other layers in the direction in which the high reflection wave(s) is detected, i.e., it is determined whether low reflection data exists in the high reflection object data.

Before continuing explanation of FIG. 5, the purpose of this invention is again explained with reference to FIG. 2, etc.

On a road where a high reflection object 100 such as the delineator is installed at intervals as shown in FIGS. 2 and 3, when a low reflection object 102 such as a human being exists in the vicinity thereof, since the width of the reflection level of the high reflection object 100 is relatively large, the width of the object 100 becomes larger than it actually is. As a result, the human being is fused or mixed with the delineator in the layers 2 and 3 as shown in FIG. (c) and (d)

Figure 7:
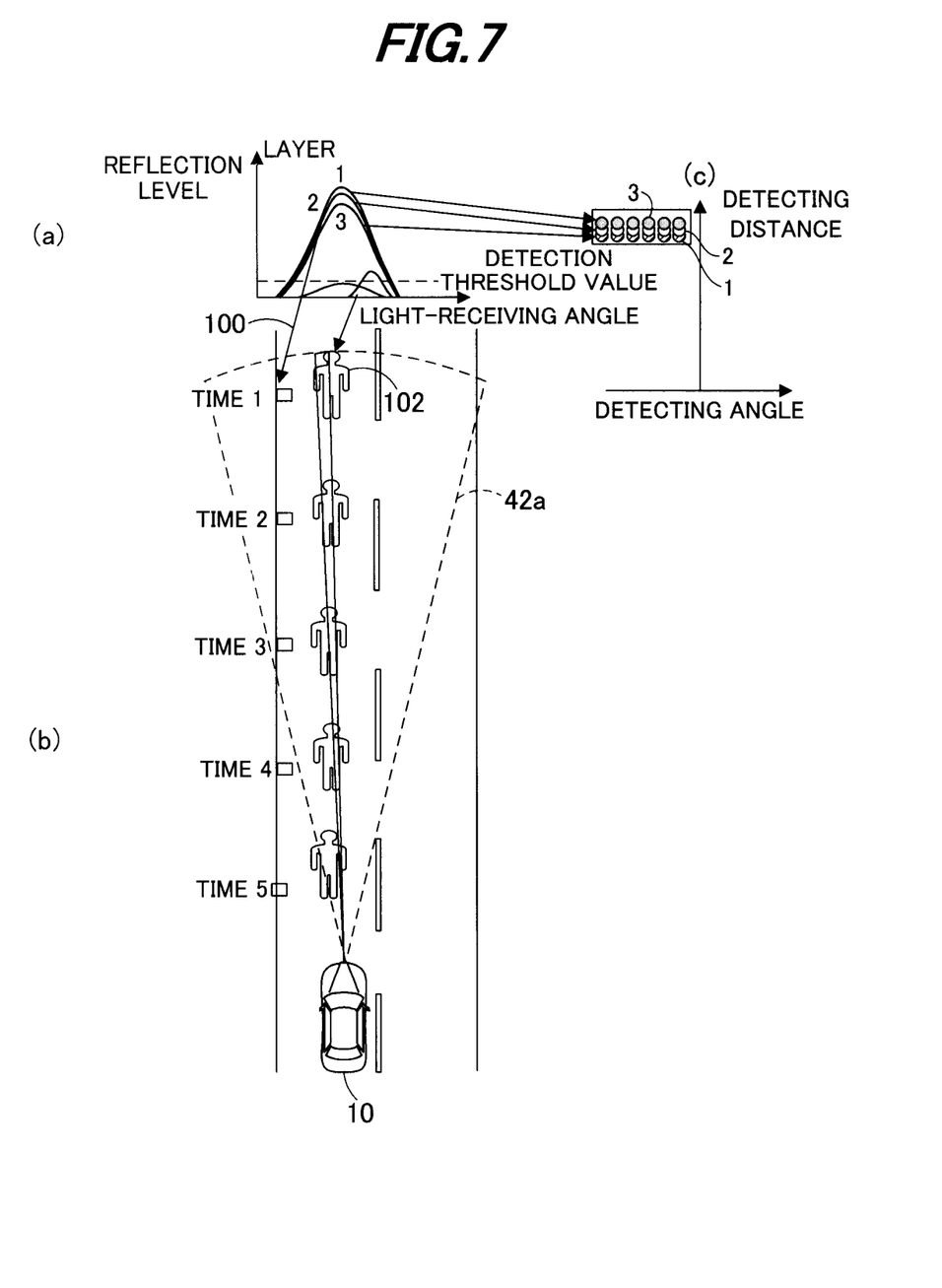
FIG. 7 is a set of views, similarly to FIG. 2, for showing detection areas of the radar in the horizontal direction; and, FIG. 8 is a set of explanatory views for explaining the processing of the FIG. 5 flowchart.

Note that FIG. 2(*a*) (and FIG. 7(*a*) explained later) shows the reflection level of the reflection wave relative to a light-receiving angle, while FIG. 2(*c*) to (*d*) (and FIG. 7(*b*)) show detection distance of the reflection wave relative to the detecting angle.

Also note that the low reflection objects can be discriminated from the high reflection object in the layer 1. However, since the subject obstacle detection apparatus needs to complete the processing within a short time, the processing should not be performed for each layer separately.

In addition, as shown in FIG. 2(*b*), the objects 100, 102 come closer with respect to time so that the high reflection object 102 becomes out of the detection area at time point 4 or time point 5. Accordingly, the low reflection object 102 can be distinguished. However, the detection at those time point is too late.

The purpose of this invention is to overcome these problems and to detect an obstacle basically from the information of the layer 2 positioned in the middle at a time point as early as possible.

The explanation of FIG. 5 is resumed. When the result in S16 is affirmative, i.e., it is determined that there is a low reflection wave in the high reflection object data, the program proceeds to S18, in which the information of the layer 1, 2 and 3 is to be processed separately. Specifically, not only the detected information of the layer 2 but that of the layer 1 and that of the layer 3 are subjected to the processing separately.

Figure 6:
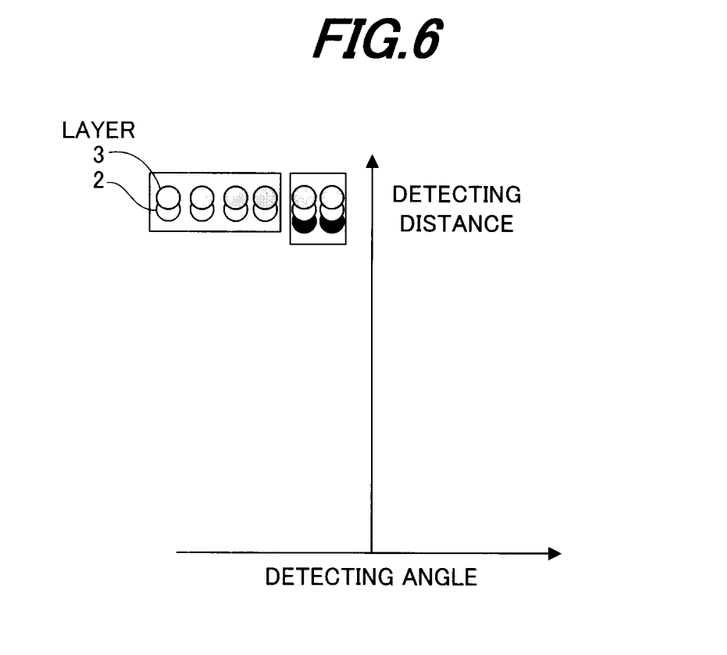
FIG. 6 is an explanatory view for explaining the processing of the FIG. 5 flowchart.

More specifically, as shown in FIG. 6, if there is the data of the low reflection object 102 in any of the three layers, the data is separated and is outputted, in other words, the low reflection object 102 corresponding to the low reflection wave is distinguished from the high reflection object 100 corresponding to the high reflection wave, and is determined as the obstacle.

On the other hand, when the result in S16 is negative, i.e., it is determined that there is no low reflection wave, the program proceeds to S20, in which the low detection threshold value is increased to the high detection threshold value (FIG. 8A) (in other words, the sensitivity of the laser radar 42 is decreased).

At the same time, the scanning direction is changed from the horizontal direction parallel to the road surface to the vertical direction perpendicular thereto, so as to rescan areas in the vicinity of the portion where the high reflection object corresponding to the high reflection wave has been detected.

Figure 4:
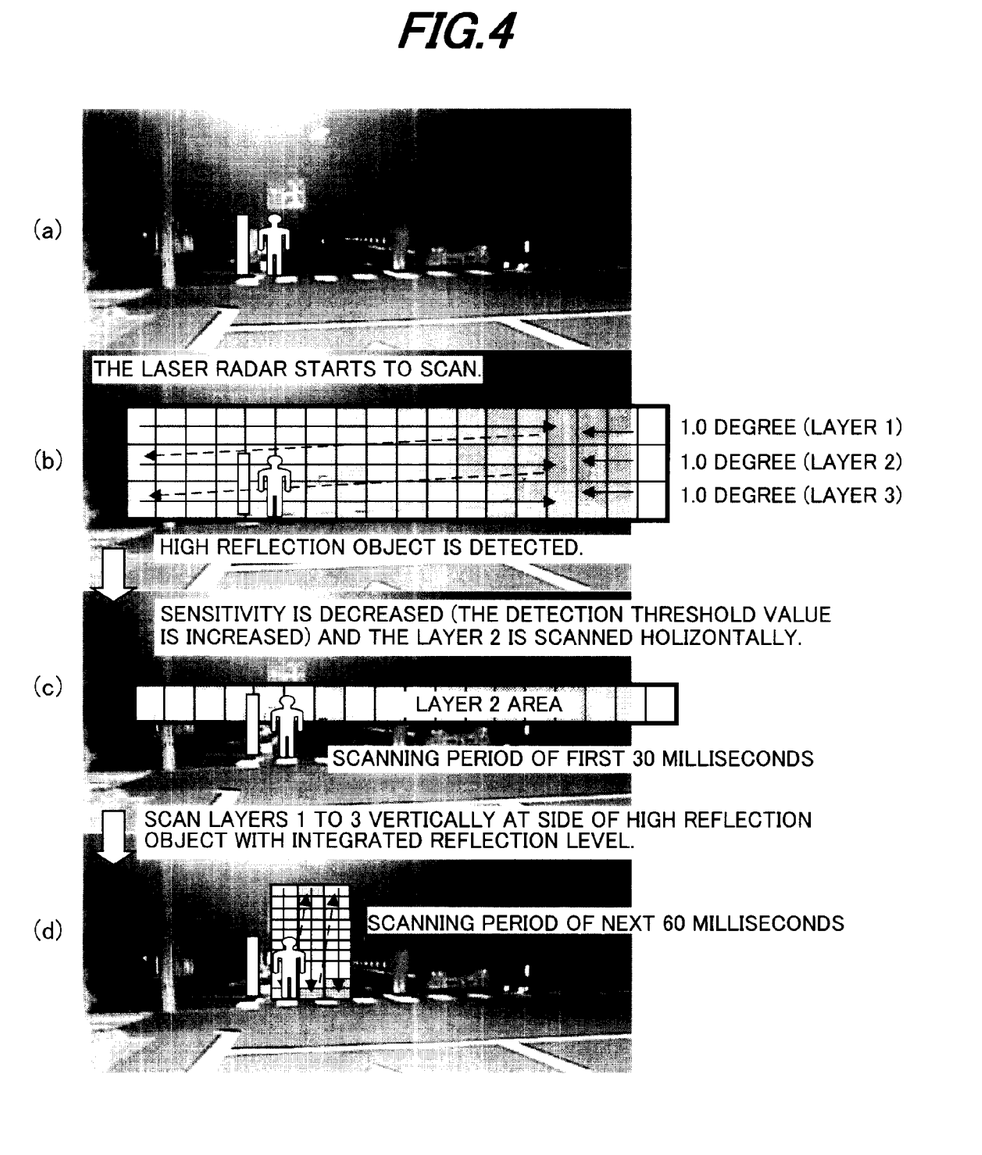
FIG. 4 is a set of explanatory views showing road images photographed from the inside of the vehicle for explaining scanning of the radar.

Explaining this with reference to FIG. 4, on a road where the human being (obstacle of low reflection object 102) exists near the high reflection object 100 as shown in FIG. 4(*a*), the layers 1 to 3 are separately scanned horizontally at every 30 milliseconds as shown in FIG. 4(*b*), in the processing of FIG. 5. Specifically, the three layers 1 to 3 are scanned horizontally within 90 milliseconds. The object detection is conducted based on the detected information of the layer 2, as described above.

At that time, when presence of the high reflection object 100 is detected from the reflection level of the laser radar 42, the sensitivity of the laser radar 42 is decreased (the detection threshold value is increased) and, as shown in FIG. 4(*c*), the layer 2 is again scanned in the horizontal direction for 30 milliseconds.

Then, as shown in FIG. 4(*d*), the scanning direction is changed to the vertical direction and the layers 1 to 3 are partially scanned, i.e., the side (side closer to the vehicle 10) of the high reflection object 100 is vertically scanned three times for the remaining 60 milliseconds.

Figure 8:
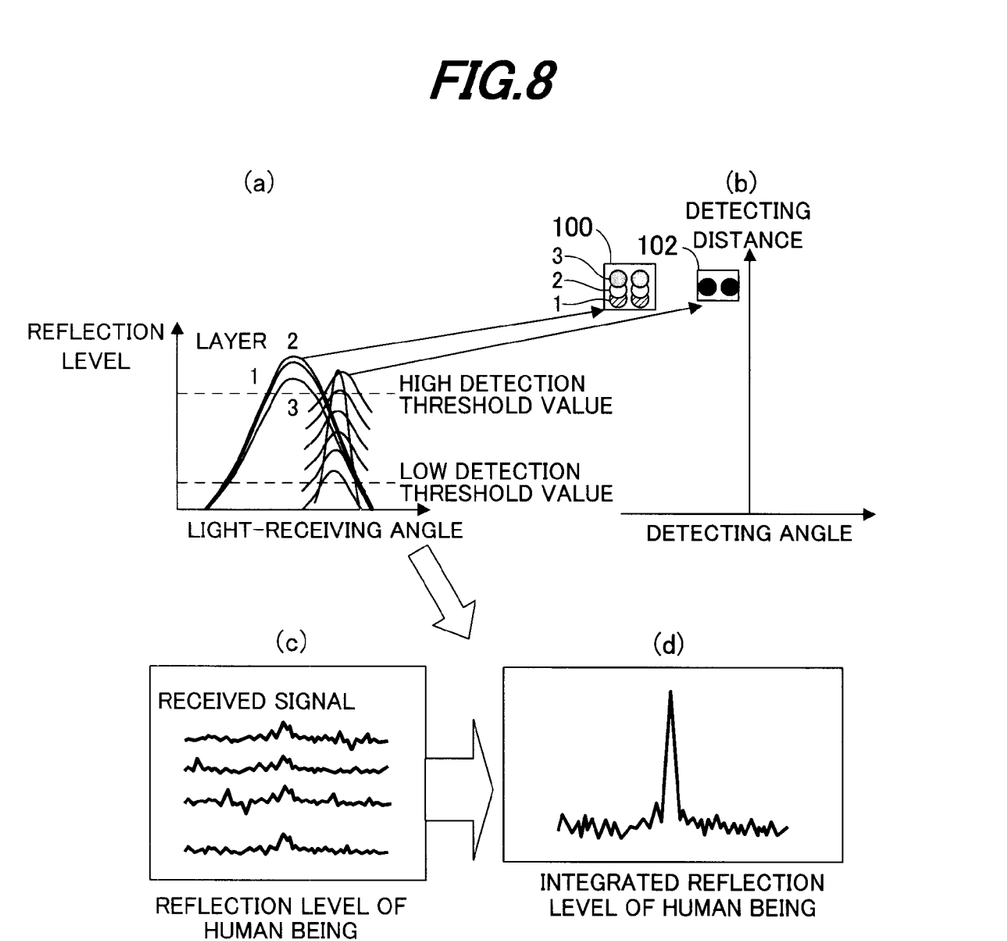

More specifically, as shown in FIGS. 8(*c*) and 8(*d*), the layers 1 to 3 are partially scanned three times while integrating the reflection level of the low reflection object (indicative of obstacle of human being, etc.) 102. Thus the low reflection object 102 corresponding to the low reflection wave can be discriminated as the obstacle other than the high reflection object 100 corresponding to the high reflection wave by scanning the side of the high reflection object 100 with increased scanning density.

As stated above, the embodiment is configured to have an apparatus for and method of detecting an obstacle (low reflection object 102) present on a road on which a vehicle (10) travels, comprising: an electromagnetic wave transceiver (laser scan radar 42, radar output processing ECU 44, ECU 40, S10) that transmits an electromagnetic wave (laser beam) in a course of travel of the vehicle so as to scan in different detection regions (layers 1, 2, 3) in a horizontal direction parallel to the road and receives reflection waves reflected from a reflection object successively; a high reflection wave determiner (ECU 40, S14) that determines whether a high reflection wave, whose reflection level exceeds a high detection threshold value, exists in the received reflection waves in at least one of the detection regions reflected from the reflection object; an obstacle determiner (ECU 40, S10 to S20) that determines whether a low reflection wave, whose reflection level exceeds a low detection threshold value set lower than the high detection threshold value, exists in the received reflection waves in the detection regions reflected from the reflection object when it is determined that the high reflection wave does not exist, and determines the reflection object as the obstacle; and a low reflection wave determiner (ECU 40, S16) that determines whether the low reflection wave reflected from a second reflection object exists in the detection regions other than the at least one when it is determined that the high reflection wave exists, wherein the obstacle determiner determines that the low reflection wave is reflected from the second reflection object and determines the second reflection object as the obstacle (S18). In the apparatus, the low reflection wave determiner determines whether the low reflection wave reflected from the second reflection object exists in the detection regions other than the at least one in a direction in which the high reflection wave is detected.

With this, it becomes possible to accurately discriminate the obstacle of low reflection object 102 such as a human being from the high reflection object 100 such as a delineator by comparing the reflection level with the detection threshold value, thereby avoiding delays in detecting the obstacle of low reflection object 102 such as a human being.

Further, the apparatus and method further includes: a detection threshold value increaser (ECU 40, S20) that increases the low detection threshold value and operates the transceiver to scan the detection regions in a vertical direction perpendicular to the road; and a second low reflection wave determiner (ECU 40, S20) that determines whether the low reflection wave reflected from a second reflection object exists in the detection regions other than the at least one when it is determined that the high reflection wave exists, wherein the obstacle determiner (ECU 40, S10 to S20) the low reflection object 102 such as a human being ECU 40, S20) determines that the low reflection wave is reflected from the second reflection object and determines the second reflection object as the obstacle. In the apparatus and method the detection threshold value increaser operates the transceiver to scan the detection regions at an area where the high reflection wave is detected.

With this, it becomes possible to accurately distinguish the obstacle of low reflection object 102 such as a human being from the high reflection object 100 such as a delineator, thereby avoiding delays in detecting the obstacle of low reflection object 102 such as a human being.

In the apparatus and method, the second low reflection wave determiner that determines whether the low reflection wave reflected from the second reflection object exists in the detection regions by integrating the reflected waves. With this, it becomes possible to accurately detect the obstacle of low reflection object 102 such as a human being.

It should be noted that, although a delineator and human being are exemplified as the high reflection object 100 and low reflection object 102, respectively, they are not limited thereto and can be other things having similar properties.

It should also be noted that, although an object is detected based on the output of the laser radar 42, a millimeter-wave radar can be utilized instead.

Japanese Patent Application No. 2009-099620 filed on Apr. 16, 2009, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A method of detecting an obstacle present on a road on which a vehicle travels, said vehicle having an electromagnetic wave transceiver that transmits an electromagnetic wave in a course of travel of the vehicle and receives reflection waves reflected from at least one reflection object successively, comprising the steps of:
    successively scanning a plurality of first detection regions, said first detection regions being vertically adjacent one another and disposed generally parallel to a surface of the road;
    determining whether a high reflection wave, whose reflection level exceeds a high detection threshold value, exists in the received reflection waves in any one of said plurality of first detection regions reflected from one of said at least one reflection object;
    when said high reflection wave is determined to exist in said any one of said plurality of first detection regions such that said high reflection wave can be associated with a first of said at least one reflection object, further determining whether a low reflection wave, whose reflection level exceeds a low detection threshold value set lower than the high detection threshold value, exists in another of the received reflection waves in other of the first detection regions that is different from the any one of said first detection regions in which the first high reflection object is determined to exist, and when said low reflection wave is determined to exist, setting the reflection object corresponding to the low reflection wave as the obstacle; and
    when the high reflection wave is determined to exist in any one of said first detection regions and said low reflection wave is not found to exist in in the received reflection waves in said plurality of first detection regions, comprising the further steps of:
        increasing the low detection threshold value and operating the transceiver to scan second detection regions successively, the second detection regions being laterally adjacent one another and disposed generally perpendicular to the surface of the road; and
        determining whether the low reflection wave reflected from a second reflection object exists in any waves reflected from the second detection regions, and upon determining the existence of low reflection waves corresponding to the second reflection object, determining the second reflection object as the obstacle.

2. The method according to claim 1, wherein the step of determining whether the low reflection wave reflected from a second reflection object exists in any reflected waves from the second detection regions is accomplished by integrating the reflected waves.

3. The method according to claim 1, wherein the second detection regions are laterally adjacent a location of the first reflection object.

4. The method according to claim 3, wherein the second detection regions are located on a lateral side of the first reflection object that faces toward a direction of vehicle travel.

* * * * *

UNITED STATES PATENT AND TRADEMARK OFFICE
CERTIFICATE OF CORRECTION

| | | |
|---|---|---|
| PATENT NO. | : 8,633,832 B2 | Page 1 of 1 |
| APPLICATION NO. | : 12/760901 | |
| DATED | : January 21, 2014 | |
| INVENTOR(S) | : Koike | |

It is certified that error appears in the above-identified patent and that said Letters Patent is hereby corrected as shown below:

In the Claims

Column 7, Line 43, Claim 1, delete "said" (first occurrence).

Column 7, Line 43, Claim 1, delete "plurality of".

Column 8, Line 6, Claim 1, after "in" (first occurrence), insert --the received reflection waves in--.

Column 8, Line 6, Claim 1, after "the" (first occurrence), delete "received reflection waves in other of the".

Column 8, Line 8, Claim 1, before "of", insert --region where the first of said at least one reflection object is detected--.

Column 8, Line 8, Claim 1, delete "of said first detection regions in which the first high".

Column 8, Line 9, Claim 1, delete "reflection object is determined to exist".

Column 8, Line 12, Claim 1, delete "wave".

Column 8, Line 12, Claim 1, before "as", insert --waves--.

Column 8, Line 15, Claim 1, delete "in" (first occurrence).

Signed and Sealed this
Twenty-seventh Day of May, 2014

Michelle K. Lee
*Deputy Director of the United States Patent and Trademark Office*